(12) United States Patent
Tanaka et al.

(10) Patent No.: US 6,440,507 B1
(45) Date of Patent: Aug. 27, 2002

(54) UNSYMMETRICAL DIOXAZINE COMPOUND DICHROIC DYE LIQUID CRYSTAL COMPOSITION AND LIQUID CRYSTAL DISPLAY ELEMENT

(75) Inventors: Toshihiko Tanaka, Ibaraki; Toru Ashida, Tsukuba, both of (JP)

(73) Assignees: Sumitomo Chemical Company, Limited, Osaka; Japan as represented by Secretary of Agency of Industrial Science and Technology; New Energy and Industrial Technology Development Organization, both of Tokyo, all of (JP)

( * ) Notice: Subject to any disclaimer, the term of this patent is extended or adjusted under 35 U.S.C. 154(b) by 0 days.

(21) Appl. No.: 09/579,541

(22) Filed: May 26, 2000

(30) Foreign Application Priority Data

May 27, 1999 (JP) ............................................ 11-148246

(51) Int. Cl.[7] ........................ C09K 19/60; C09K 19/54; C07D 498/04; C07D 265/36; C09B 19/02
(52) U.S. Cl. .................. 428/1.1; 252/299.1; 252/299.5; 544/76; 544/99
(58) Field of Search .................. 252/299.1; 544/76, 544/99; 428/1.1

(56) References Cited

U.S. PATENT DOCUMENTS

| 2,267,741 | A |   | 12/1941 | Langbein |   |
|---|---|---|---|---|---|
| 6,080,858 | A | * | 6/2000 | Schumacher | 544/99 |
| 6,146,430 | A | * | 11/2000 | Tatsuma et al. | 8/454 |
| 6,281,361 | B1 | * | 8/2001 | Nesvadba et al. | 549/276 |

FOREIGN PATENT DOCUMENTS

JP             61-275703      * 12/1986

OTHER PUBLICATIONS

Derwent week 198703 Acct–no 1987–017986 English abstract of JP61–275703.*

* cited by examiner

*Primary Examiner*—Shean C. Wu
(74) *Attorney, Agent, or Firm*—Birch, Stewart Kolasch & Birch, LLP (57) ABSTRACT

An unsymmetrical dioxazine compound represented by the formula (1-1) or (1-2) below, a dichroic dye, a liquid crystal composition containing the same, and a liquid crystal display element fabricated with the same:

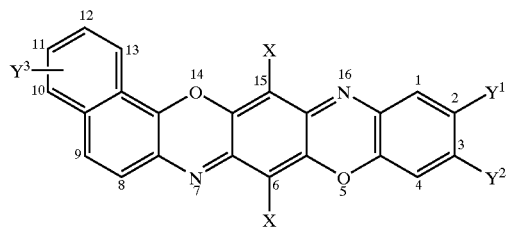

(1-1)

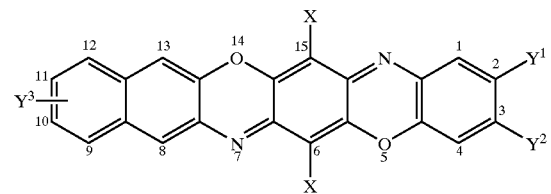

(1-2)

(In the formula, each of $Y^1$ to $Y^3$ stands for a group represented by the formula (2) or (3) ; X stands for H or the like; h is an integer of 0 to 2; A stands for phenylene or the like; E stands for phenylene or the like; G stands for H, F, or the like; i is an integer of 1 to 2; j is an integer of 0 to 2, each of J and M stands for phenylene or the like; and Q stands for H, F or the like.)

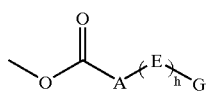

(2)

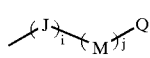

(3)

5 Claims, 1 Drawing Sheet

Fig.1

UNSYMMETRICAL DIOXAZINE COMPOUND DICHROIC DYE LIQUID CRYSTAL COMPOSITION AND LIQUID CRYSTAL DISPLAY ELEMENT

FIELD OF ART

The present invention relates to a novel unsymmetrical dioxazine compound that can be used as a dichroic dye useful in the art of liquid crystal display elements, a dichroic dye, a liquid crystal composition, and a liquid crystal display element fabricated with the liquid crystal composition.

BACKGROUND ART

Compositions containing a liquid-crystalline material and a small amount of a dichroic dye are used for production of liquid crystal display elements of a guest-host type (abbreviated as GH hereinbelow). The GH system is an important system of liquid crystal display elements. This system, which utilizes the colors of dichroic dyes to realize colored display, has recently been attracting attention as means for improving the efficiency of light utilization in color liquid crystal display elements, without requiring color filters. A variety of GH liquid crystal display elements have been drawing interests, such as those consisting of a laminate of Heilmeier type GH cells, those consisting of a laminate of double layer GH type liquid crystal display elements (DGH), and those consisting of a laminate of cholesteric-nematic phase change GH type liquid crystal display elements (PCGH) Recently, reflection type liquid crystal display elements are of particular interest in view of energy conservation or securance of battery life in portable devices. The reflection type liquid crystal display elements lack auxiliary light sources such as back lights, so that use of such GH liquid crystal display elements in the reflection type elements is believed to be advantageous due to their high efficiency of light utilization.

As dichroic dyes for the GH liquid crystal displays, excellent materials with high dichroic ratios have been developed, such as azo dyes, anthraquinone dyes, and quinophthalone dyes. Such materials exhibit high dichroic ratios in many liquid-crystalline materials (Alexander V. Ivashchenko, *Dichroic Dyes for Liquid Crystal Displays*, p165–337, (CRC Press), 1994).

In general, the absorption spectra of dichroic dyes have considerable influence on colored display of GH liquidcrystaldisplays. Thus, inordertobroadenthe range of the displayable color tones and to ensure color rendering properties, it is necessary to control each of the primaries independently and to combine dyes which overlap little in absorbable wavelength.

The overlap of absorbable wavelengths prevents the independent control of the primaries to narrow the range of the displayable colors, and accompanies additional light absorption to lower the efficiency of light utilization. For avoiding the overlap of absorbable wavelengths, selection of the peak absorption wavelength for each color is important. However, mere selection of the peak absorption wavelength still allows some overlap of absorbable wavelengths since absorption spectra of dyes are generally broad. Thus, it is particularly advantageous for dichroic dyes to have as narrow light absorption bands as possible in order to reduce the overlap.

Dioxazine dyes were originally developed as a kind of pigments, and are now generally known to have a narrow light absorption band and to exhibit vivid color tones.

However, the dichroic ratios of conventional dichroic dyes having a dioxazine skeleton are relatively low in liquid crystal, i.e. about 6 to 7, compared to those of azo dyes and anthraquinone dyes (Alexander V. Ivashchenko, *Dichroic Dyes for Liquid Crystal Displays*, p173, (CRC Press), 1994). Consequently, development of dioxazine dyes with higher dichroic ratios is desired.

DISCLOSURE OF THE INVENTION

It is an object of the present invention to provide a novel unsymmetrical dioxazine compound having a narrow light absorption band and a high dichroic ratio, a dichroic dye, a liquid crystal composition, and a liquid crystal display element fabricated with the same.

The present inventors have made intensive studies for achieving the above object to find out that a novel compound having an unsymmetrical dioxazine skeleton with particular substituents incorporated thereto has a high dichroic ratio in liquid crystal, thereby completing the present invention.

According to the present invention, there is provided an unsymmetrical dioxazine compound represented by the formula (1-1) or (1-2):

(1-1)

(1-2)

wherein each of $Y^1$ to $Y^3$ stands for a group represented by the formula (2) or (3) with at least one of $Y^1$ to $Y^3$ being a group represented by the formula (2); X stands for a hydrogen atom, a halogen atom, a cyano group, an alkyl group, an aryl group, an alkoxy group, an acylamino group, or a carboxylate group:

(2)

(3)

wherein h is an integer of 0 to 2, i is an integer of 1 to 2, and j is an integer of 0 to 2; A stands for a group selected from group (I) consisting of:

(I)

wherein k is an integer of 1 to 6; one or more of hydrogen atoms in a phenylene group may be substituted by an alkyl group having 1 to 12 carbon atoms, an alkoxy group having 1 to 12 carbon atoms, a perfluoroalkyl group having 1 to 6 carbon atoms, or a halogen atom; when A is a group having ends (a) and (b), the end (a) binds to E or G and the end (b) binds to the ester group in the formula (2);

each of E, J, and M stands for a group selected from group (II) consisting of:

wherein m is an integer of 1 to 12, and each of q and r is an integer of 1 to 8; one or more of hydrogen atoms in a phenylene group may be substituted by an alkyl group having 1 to 6 carbon atoms, an alkoxy group having 1 to 6 carbon atoms, a perfluoroalkyl group having 1 to 6 carbon atoms, or a halogen atom; when E in the formula (2) is a group having ends (a) and (b), the end (a) binds to G or E and the end (b) binds to A or E; when J in the formula (3) is a group having ends (a) and (b), the end (a) binds to M, J, or Q, and the end (b) binds to J or a triphenodioxazine skeleton; when M in the formula (3) is a group having ends (a) and (b) the end (a) binds to M or Q and the end (b) binds to M or J;

G and Q each stands for a group selected from group (III) consisting of:

wherein n is an integer of 1 to 12, and each of q, r, and s is an integer of 1 to 8.

According to the present invention, there is also provided a dichroic dye consisting of an unsymmetrical dioxazine compound represented by the formula (1-1) or (1-2).

According to the present invention, there is also provided a liquid crystal composition comprising at least one dichroic dye mentioned above and a liquid-crystalline material.

According to the present invention, there is also provided a liquid crystal display element comprising at least one liquid crystal composition mentioned above as a liquid-crystalline material.

BRIEF DESCRIPTION OF THE DRAWINGS

FIG. 1 is a chart illustrating the polarized light absorption spectra of a cell measured in Example 1.

PREFERRED EMBODIMENTS OF THE INVENTION

The unsymmetrical dioxazine compounds of the present invention, which are represented by the above formula (1-1) or (1-2), are dichroic, and thus can be used as a dichroic dye, for example, contained in a liquid crystal composition for GH liquid crystal.

Of the unsymmetrical dioxazine compounds represented by the formula (1-1) or (1-2), the compound represented by the formula (1-1) is preferred for its solubility in liquid-crystalline materials.

In the formulae (1-1) and (1-2), X stands for a hydrogen atom, a halogen atom, a cyano group, an alkyl group, an aryl group, an alkoxy group, an acylamino group, or a carboxylate group. X may suitably be selected from the above depending on the type of the liquid-crystalline material in which the compound is to be dissolved, the required solubility in the liquid-crystalline material, or the like factors. For improving the dichroic ratio of the compound in a common liquid crystal composition, X is preferably a hydrogen atom, a halogen atom, a cyano group, an acylamino group, or a carboxylate group, more preferably a hydrogen atom, a chlorine atom, a bromine atom, or a fluorine atom, and most preferably a hydrogen atom or a chlorine atom.

In the formulae (1-1) and (1-2), each of $Y^1$ to $Y^3$ stands for a group represented by the above formula (2) or (3) with at least one or two of $y_1$ to $Y^3$ being an ester group represented by the formula (2).

A in the formula (2) is selected from the groups listed in group (I) mentioned above. In the groups listed in group (I), one or more hydrogen atoms in a phenylene group may be substituted by an alkyl group having 1 to 12 carbon atoms, an alkoxy group having 1 to 12 carbon atoms, a perfluoroalkyl group having 1 to 6 carbon atoms, or a halogen atom. The number of such substituents in a phenylene group is preferably 0 to 2 for a higher dichroic ratio of the resulting unsymmetrical dioxazine compound in a liquid-crystalline material. The substituents are preferably alkyl groups having 1 to 12 carbon atoms, or alkoxy groups having 1 to 12 carbon atoms, and more preferably alkyl groups having 1 to 8 carbon atoms, or alkoxy groups having 1 to 8 carbon atoms, for ready synthesis of the compound.

A may suitably be selected from group (I) depending on the type of the liquid-crystalline material in which the compound is to be dissolved, the required solubility in the liquid-crystalline material, or the like factors. In general, A is preferably a group having a phenylene group, and particularly preferred is a phenylene group, for ready synthesis of the compound.

In the formula (2), when A is a group having ends (a) and (b) selected from group (I), the end (a) binds to E or G and the end (b) binds to the ester group in the formula (2). In the formula of the group having k in group (I) for A, k is an integer of 1 to 6.

E in the formula (2) is selected from the groups listed in group (II) mentioned above. E may suitably be selected from group (II) depending on the type of the liquid-crystalline material in which the compound is to be dissolved, the required solubility in the liquid-crystalline material, or the like factors. Where E is a group having ends (a) and (b) selected from group (II), when h in the formula (2) is 1, the end (a) binds to G and the end (b) binds to A; whereas when h is 2, the end (a) of one E binds to the other E, of which end (a) in turn binds to G, and the end (b) of one E binds to the other E, of which end (b) in turn binds to A. In the formula (2), h is an integer of 0 to 2, but for ready synthesis of the compound, h is preferably 0 or 1, and most preferably 0.

G in the formula (2) is selected from the groups listed in group (III) mentioned above. G may suitably be selected from group (III) depending on the type of the liquid-crystalline material in which the compound is to be dissolved, the required solubility in the liquid-crystalline material, or the like factors. In general, G is preferably an alkyl, alkylcycloalkyl, or alkoxy group for ready synthesis of the compound, and an alkyl or alkoxy group is particular preferred. In the formulae of the groups for G, n is an integer of 1 to 12, and each of q, r, and s is an integer of 1 to 8.

In the formula (3), each of J and M is selected from the groups listed in group (II) mentioned above. J and M may suitably be selected from group (II) depending on the type of the liquid-crystalline material in which the compound is to be dissolved, the required solubility in the liquid-crystalline material, or the like factors. In general, J is preferably a group having an oxygen atom at end (b), which is to bind to the dioxazine ring, and more preferably an alkoxy group having an oxygen atom at end (b). M is also preferably a group having an oxygen atom at end (b). When J in the formula (3) is a group having ends (a) and (b) selected from group (II), the end (a) binds to M, J, or Q depending on the number denoted by i and j, whereas the end (b) binds to J or the dioxazine skeleton depending on the number denoted by i and j. When M in the formula (3) is a group having ends (a) and (b) selected from group (II), the end (a) binds to M or Q depending on the number denoted by j, whereas the end (b) binds to M or J. In the formula (3), i is an integer of 1 to 2, and j is an integer of 0 to 2. For ready synthesis of the compound, the sum of i and j is preferably not more than 3, and more preferably not more than 2.

Q in the formula (3) is selected from the groups listed in group (III) mentioned above. Q may suitably be selected from group (III) depending on the type of the liquid-crystalline material in which the compound is to be dissolved, the required solubility in the liquid-crystalline material, or the like factors. In general, Q is preferably an alkyl, alkylcycloalkyl, or alkoxy group for ready synthesis of the compound, and analkyl or alkoxy group is particularlypreferred. In the formulae of groups in group (III) for Q, n is an integer of 1 to 12, and each of q, r, and s is an integer of 1 to 8.

In the groups listed in group (II) for E, J, and M in the formulae (2) and (3), one or more hydrogen atoms in a phenylene group may be substituted by an alkyl group having 1 to 6 carbon atoms, an alkoxy group having 1 to 6 carbon atoms, a perfluoroalkyl group having 1 to 6 carbon atoms, or a halogen atom.

Examples of the unsymmetrical dioxazine compound of the present invention include the compounds represented by the following formulae:

-continued

The unsymmetrical dioxazine compound of the present invention may be synthesized through a publicly known method or a combination thereof. The detail of the process may vary depending on the molecular structure of the compound to be synthesized, but in general, an unsymmetrical dioxazine compound of the present invention may be synthesized through the following process from a corresponding, unsymmetrical 2,5-diamino-1,4-benzoquinone compound represented by the formula (4):

(4)

wherein each of $Y^1$ to $Y^3$ stands for a group represented by the formula (2) or (3) with at least one of $Y^1$ to $Y^3$ being a group represented by the formula (2); X stands for a hydrogen atom, a halogen atom, a cyano group, an alkyl group, an aryl group, an alkoxy group, an acylamino group, or a carboxylate group.

The 2,5-diamino-1,4-benzoquinone compound may be synthesized in accordance with a method, for example, as disclosed in U.S. Pat. No. 2,267,741. Specifically, the compound may be synthesized by mixing altogether and reacting a 3-alkoxy-2,5,6-trichloro-1,4-benzoquinone compound, an aniline compound represented by the formula (4A), and an aminonaphthalene compound represented by the formula (4B); or by reacting a 3-alkoxy-2,5,6-trichloro-1,4-benzoquinone compound with one of an aniline compound represented by the formula (4A) and an aminonaphthalene compound represented by the formula (4B), and subsequently with the other of the two compounds.

In the formulae, X and $Y^1$ to $Y^3$ are the same as X and $Y^1$ to Y3 in formula (4) above.

The reactions mentioned above may be carried out in an appropriate reaction medium, if required. Examples of such reaction medium include water; alcohols such as methanol, ethanol, and isopropanol; aromatic hydrocarbons such as toluene and xylene; ketones such as acetone and methylisobutylketone; ethers such as tetrahydrofuran and dioxane; and mixtures thereof.

The reaction between the 3-alkoxy-2,5,6-trichloro- 1,4-benzoquinone compound and one of the aniline compound represented by the formula (4A) and the aminonaphthalene compound represented by the formula (4B) may be carried out in a reaction medium different from that is used for the reaction between the 3-alkoxy-2,5,6-trichloro-1,4-benzoquinone compound and the other of the two compounds.

The aniline compound represented by the formula (4A) and the aminonaphthalene compound represented by the formula (4B) may be prepared in accordance with publicly known methods. For example, the compounds may be prepared by a method, such as catalytic reduction, including treatment of a corresponding nitro compound with a conventional reducing agent.

Such nitro compound may be prepared in accordance with a publicly known method, for example, by treating a corresponding aromatic compound with a conventional nitrating agent such as nitric acid.

The resulting 2,5-diamino-1,4-benzoquinone compound is made to undergo ring closure to give an objective unsymmetrical dioxazine compound, where the ring closure may be effected by heating the 2,5-diamino-1,4-benzoquinone compound in the presence of an acidic condensing agent.

Examples of the acidic condensing agent include chlorides of carboxylic or sulfonic acid, such as benzoylchloride, butylbenzoylchloride, and paratoluenesulfonylchloride; bromides of carboxylic or sulfonic acid; thionylchloride; phosphorus pentachloride; hydrochloric acid; hydrobromic acid; acetic anhydride; fuming sulfuric acid; paratoluenesulfonic acid; and metal chlorides, such as aluminum chloride and zinc chloride. Among these, chlorides of carboxylic acid such as benzoylchloride and parabutylbenzoylchloride are preferred for their reaction yield and handiness. If the 2,5-diamino-1,4-benzoquinone compound has a methoxy group, use of a chloride or bromide of carboxylic acid will result in substitution of the methoxy group portion to form an ester group corresponding to the chloride or bromide of carboxylic acid.

The conditions of the reaction may vary depending on the type of the acidic condensing agent and the type of the 2,5-diamino-1,4-benzoquinone compound. For example, when the acidic condensing agent is a chloride of carboxylic acid, the reaction may usually be effected by heating the 2,5-diamino-1,4-benzoquinone compound in a solvent in the presence of a chloride of carboxylic acid to have the compound undergo ring closure, thereby giving the objective unsymmetrical dioxazine compound. The reaction temperature may usually be in the range of 100° C. to 220° C., preferably 130° C. to 180° C.

The reaction may be effected in a solvent, for example in a polar organic solvent such as nitrobenzene, orthodichlorobenzene, dimethylformamide, or dimethylsulfoxide. Of these, nitrobenzene and orthodichlorobenzene are preferred, and nitrobenzene is most preferred.

The unsymmetrical dioxazine compound of the present invention may be synthesized through other processes, such as by first synthesizing an unsymmetrical dioxazine compound represented by the formula (1-1) or (1-2) with X being a halogen atom, and then treating the resulting compound with a variety of reagents to convert X in the formula (1-1) or (1-2) into a group other than the halogen atom. Specifically, the process includes synthesizing a dioxazine compound represented by the formula (1-1) or (1-2) with X being a chlorine or bromine atom, and then treating the resulting compound with metal (e.g. tin or iron) and acid (e.g. polyphosphoric acid) to convert X in the formula (1-1) or (1-2) into ahydrogen atom; or includes synthesizing an unsymmetrical dioxazine compound represented by the formula (1-1) or (1-2) with X being a bromine atom, and then treating the resulting compound with a metallocyanide (e.g. cuprous cyanide) to convert X into a cyano group.

The liquid crystal composition of the present invention at least contains a dichroic dye composed of the unsymmetrical dioxazine compound of the present invention mentioned above, and a liquid-crystalline material.

The type and amount of the liquid-crystalline material for the liquid crystal composition of the present invention may suitably be selected depending on the objective liquid crystal phase. The liquid crystal phase may be a conventionally known phase such as a nematic, cholesteric, smectic, or discotic phase.

When the liquid crystal composition is used as GH liquid crystal, liquid-crystalline materials which take a nematic, cholesteric, or smectic phase are preferably used, and those which take a cholesteric or nematic phase are particularly preferred. The type of a liquid crystal phase usually depends on the kind of a liquid-crystalline material, but in some cases, a small amount of additive may cause change in the liquid crystal phase. For example, addition of a small amount of an optically active material may sometimes cause expression of a cholesteric phase. Incidentally, the dielectric anisotropy of the liquid crystal composition of the present invention may either be positive or negative, depending on the type of the objective liquid crystal display element.

In the liquid crystal composition of the present invention, usually the content of the liquid-crystalline material is preferably not less than 80% by weight, more preferably not less than 90% by weight, and most preferably not less than 95% by weight of the entire composition for giving a stable liquid crystal phase over a wide temperature range. The liquid-crystalline material may be a single compound or a mixture of two or more compounds, but generally a mixture of two or more compounds is preferably used for giving a stable liquid crystal phase over a wide temperature range.

Examples of the liquid-crystalline material include a variety of compounds such as biphenyl, phenylcyclohexane, phenylpyrimidine, or cyclohexylcyclohexane compounds which take a nematic or smectic phase, or mixtures thereof, as described in *Liquid Crystal Device Handbook,* Edited by Nihon Gakujutsu Shinkokai, 142th Committee (1989), p152–192, p715–722. Preferred examples of such material include the compounds represented by the following formulae or mixtures thereof:

-continued

In the above formulae, one to four hydrogen atoms in a phenyl group may be substituted by a halogen atom such as a fluorine or chlorine atom, or a cyano group. V and W each stands for an alkyl group, an alkoxy group, an alkoxyalkyl group, an alkylphenyl group, an alkoxyalkylphenyl group, an alkoxyphenyl group, an alkylcyclohexyl group, an alkoxyalkylcyclohexyl group, an alkylcyclohexylphenyl group, a cyanophenyl group, a cyano group, a halogen atom, a fluoromethyl group, a fluoromethoxy group, an alkylphenylalkyl group, an alkoxyphenylalkyl group, an alkylcyclohexylalkyl group, an alkoxyalkoxyhexylalkyl group, an alkoxyphenylalkyl group, or an alkylcyclohexylphenylalkyl group. The center of optical activity may be in an alkyl or alkoxy chain of these groups. Further, in the groups mentioned for V and W, one or more hydrogen atoms in a phenyl or phenoxy group may be substituted by a halogen atom such as a fluorine or chlorine atom, or a cyano group. In the formulae, U stands for a hydrogen atom, a halogen atom, or a cyano group.

The liquid-crystalline material is not limited to the compounds mentioned above. For example, fluorine-containing liquid-crystalline materials having one or more fluorine atoms or fluorine-containing groups such as —$CF_3$ or —$OCF_3$ incorporated therein as substituents may be used, which are used preferably for thin film transistor liquid crystal displays (TFT·LCD).

The unsymmetrical dioxazine compound represented by the formula (1-1) or (1-2) used as a dichroic dye for the liquid crystal composition of the present invention may slightly fluctuate in purity depending on the kind of the dye or the synthesis process. The unsymmetrical dioxazine compound of 90 to 100% by weight purity may usually be used, but the purity is preferably 98 to 100% by weight, more preferably 99 to 100% by weight, and most preferably 99.5 to 100% by weight.

The content of the unsymmetrical dioxazine compound as a dichroic dye in the liquid crystal composition of the present invention is not particularly limited, and may suitably be selected depending on the kind of the unsymmetrical dioxazine compound, the type of the objective liquid crystal phase, or the like factors. The content of the compound is usually 0.01 to 10% by weight, preferably 0.01 to 5% by weight of the entire composition.

The liquid crystal composition of the present invention may optionally contain additional components in addition to the unsymmetrical dioxazine compound as a dichroic dye and the liquid-crystalline material, depending on the purpose. Examples of such additional components include an optically active material or a stabilizer. The content of such additional components, if contained, needs to be controlled suitably so as not to disturb the expression of the liquid crystal phase.

The liquid crystal composition of the present invention may be prepared by mixing together the unsymmetrical dioxazine compound as a dichroic dye, the liquid-crystalline material, and other components, if any. The mixing may be carried out by a conventional manner. For example, the present liquid crystal composition may be prepared by heating the liquid-crystalline material to have it melt into an isotropic liquid, and dissolving the unsymmetrical dioxazine compound as a dichroic dye in the liquid through mixing.

The liquid crystal composition containing the unsymmetrical dioxazine compound of the present invention has a high dichroic ratio and a narrow light absorption band (the half-width of absorption). Therefore, liquid crystal display elements fabricated from this composition are capable of displaying a variety of color tones vividly, and are thus of high industrial value.

The liquid crystal display element of the present invention includes, as a liquid crystal material, at least one liquid crystal composition mentioned above. The liquid crystal display element may have a basic structure of any liquid crystal display element referred to as a GH type. In particular, a variety of basic structures wherein colored display is realized without using a color filter but by coloration of a liquid crystal layer, may be preferably applied to the present liquid crystal display element. In these types of basic structure, the liquid crystal layer containing the liquid crystal composition of the present invention is colored vividly, to thus effect more vivid colored display compared to the conventional elements.

EXAMPLES

The present invention will now be explained in detail with reference to Examples and Comparative Examples, but the present invention is not limited to these. Incidentally, each measurement in the Examples and Comparative Examples was conducted as follows. (i) The dichroic ratio of an unsymmetrical dioxazine compound was determined by measuring the polarized light absorption spectra of cells, which had been produced as will be described later and charged with liquid crystal composition (1a) containing an unsymmetrical dioxazine compound or with corresponding liquid crystal composition (1b) not containing an unsymmetrical dioxazine compound. More specifically, absorption $(a_1)$ of light polarized parallel to the direction in which the cell was rubbed, and absorption $(a_2)$ of light polarized perpendicular to the direction in which the cell was rubbed, were measured over a predetermined waveband (300 to 800 nm) The difference in peak absorption between the compositions (1a) and (1b) was taken as the absorption of the unsymmetrical dioxazine compound per se, and the dichroic ratio was determined by the formula below, with the difference in $(a_1)$ between the compositions (1a) and (1b) being denoted by $(A_1)$, whereas difference in $(a_2)$ between the compositions (1a) and (1b) being denoted by $(A_2)$:

Dichroic Ratio=$(A_1)/(A_2)$

Fabrication of Cells

On one side of a quartz plate, a polyimide alignment film material (manufactured by HITACHI CHEMICAL CO., LTD., trade name "LX1400") was applied in a thickness of about 20 nm, and heated to obtain a substrate having a polyimide alignment film. The resulting substrate was rubbed with a cloth in one direction. Two of such substrates were prepared, and spaced 17 to 24 μm apart with their alignment films facing each other and with the directions of rubbing being aligned. An adhesive containing a spacer was applied around the periphery of the substrates and hardened to fix the substrates to each other, thereby obtaining a cell for measurement. (ii) The half-width of absorption was calculated by determining the spectrum of absorption of the light polarized parallel to the direction in which the cell was rubbed, and introducing in the following formula the values of the wavelengths $W_1$ and $W_2$ of a certain peak at half of its height (absorption):

Half-width of Absorption=$|W_1-W_2|$

Example 1

Synthesis of 2,5-diamino-1,4-benzoquinone Compound Represented by Formula (5)

In generally accordance with the method disclosed in U.S. Pat. No. 2,267,741, the 2,5-diamino-1,4-benzoquinone compound represented by the formula (5) was synthesized from a 3-ethoxy-2,5,6-trichloro-1,4-benzoquinone compound. Structure of the resulting compound was determined from the mass spectrum (FDMS).

(5)

Synthesis of Unsymmetrical Dioxazine Compound Represented by Formula (6)

To 40 g of nitrobenzene, 1.7 g of the 2,5-diamino-1,4-benzoquinone compound represented by the formula (5) obtained above and 0.4 g of 4-(n)-butylbenzoylchloride were added. The resulting mixture was kept at 150–160° C. for 4 hours, then allowed to cool, and filtered. The separated precipitate was purified repeatedly by silica gel thin layer chromatography, thereby obtaining a compound.

The structure of the compound thus obtained was determined from the mass spectrum (FDMS) and the nuclear magnetic resonance ($^1$H-NMR) spectrum of the compound. The FDMS of the obtained compound indicated a mass number of 794. The results of $^1$H-NMR (500 MHz) measurement were as follows:

8.12–8.16 ppm (H, d, naphthalene ring), 8.01–8.04 ppm (2H, d, phenylene ring), 7.5–7.53 ppm (H, d, naphthalene ring), 7.39–7.42 ppm (H, d, naphthalene ring), 7.24–7.26 ppm (2H, d, phenylene ring), 7.11–7.15 ppm (H, m, naphthalene ring), 7.06 ppm (1H, s, dioxazine ring), 6.99 ppm (1H, s, dioxazine ring), 6.95–6.96 ppm (H, d, naphthalene ring), 3.89–3.93 ppm (2H, t, —O—CH$_2$—), 3.82 ppm (3H, s, —O—CH$_3$), 2.62–2.67 ppm (2H, t, —CH$_2$—), 1.55–1.65 ppm (4H, m, —CH$_2$—), 1.3–1.35 ppm(2H, m, —CH$_2$—), 1.0–1.26 ppm (20H, br, —CH$_2$—), 0.8–0.95 ppm (6H, m, —CH$_3$).

Incidentally, the chemical shift was calculated using tetramethylsilane as a reference (0 ppm).

From the results mentioned above, the obtained unsymmetrical dioxazine compound was determined to have the structure represented by the formula (6):

(6)

Evaluation of Dichroic Ratio

A liquid crystal composition was prepared by mixing 0.1% by weight of the obtained unsymmetrical dioxazine compound represented by the formula (6) with a liquid crystal composition E7 (manufactured by MERCK JAPAN LIMITED). The resulting liquid crystal composition and the liquid crystal composition E7 per se were respectively sealed in a cell, and the absorption, the dichroic ratio, and the half-width of absorption were determined. Further, the same experiments were performed using a liquid crystal composition E9 (manufactured by MERCK JAPAN LIMITED) or a liquid crystal composition ZLI1132 (manufactured by MERCK JAPAN LIMITED), in place of the liquid crystal composition E7. The results are shown in Table 1.

Figure 1:
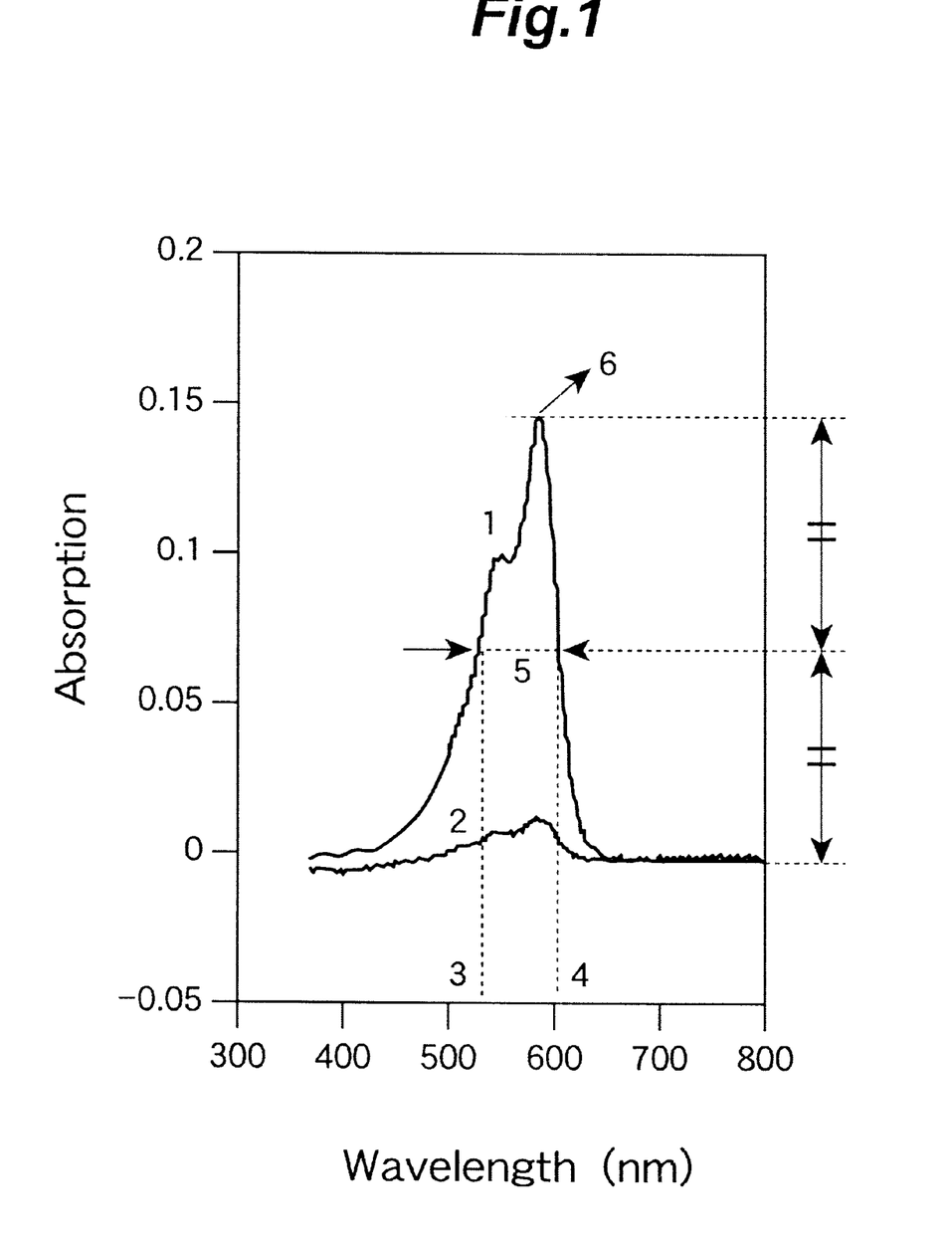
In FIG. 1, 1 refers to the spectrum of absorption of the light polarized parallel to the direction in which the cell was rubbed; 2 the spectrum of absorption of the light polarized perpendicular to the direction in which the cell was rubbed; 3 wavelength $W_1$; 4 wavelength $W_2$; 6.5 the half-width of absorption; and 6 the peak of the absorption spectrum.

The polarized light absorption spectra of the liquid crystal composition prepared by mixing 0.1% by weight of the unsymmetrical dioxazine compound represented by the formula (6) in the liquid crystal composition E9 (manufactured by MERCK JAPAN LIMITED) are shown in FIG. 1. In the figure, 1 refers to the spectrum of absorption of the light polarized parallel to the direction in which the cell was rubbed; 2 the spectrum of absorption of the light polarized perpendicular to the direction in which the cell was rubbed; 3 wavelength $W_1$; 4 wavelength $W_2$; 5 the half-width of absorption; and 6 the peak of the absorption spectrum.

Example 2

Synthesis of 2,5-diamino-1,4-benzoquinone Compound Represented by Formula (7)

In general accordance with the method disclosed in U.S. Pat. No. 2,267,741, the 2,5-diamino-1,4-benzoquinone compound represented by the formula (7) was synthesized from a 3-ethoxy-2,5,6-trichloro-1,4-benzoquinone compound. The structure of the resulting compound was determined from the mass spectrum (FDMS).

(7)

Synthesis of Unsymmetrical Dioxazine Compound Represented by Formula (8)

To 40 g of nitrobenzene, 1.7 g of the 2,5-diamino-1,4-benzoquinone compound represented by the formula (7) obtained above and 0.4 g of 4-(n)-butylbenzoylchloride were added. The resulting mixture was kept at 150–160° C. for 4 hours, then allowed to cool, and filtered. The separated precipitate was purified repeatedly by silica gel thin layer chromatography, thereby obtaining a compound.

The structure of the compound thus obtained was determined from the mass spectrum (FDMS) and the nuclear magnetic resonance ($^1$H-NMR) spectrum of the compound. The FDMS of the obtained compound indicated the mass number of 794. The results of $^1$H-NMR (500 MHz) measured were as follows:

8.07–8.09 ppm (2H, d, benzene ring), 7.58–7.60 ppm (1H, d, naphthalene ring), 7.50–7.51 ppm (1H, d, naphthalene ring), 7.49–7.51 ppm (1H, d, naphthalene ring), 7.44–7.46 ppm (1H, d, naphthalene ring), 7.29–7.31 ppm (2H, d, benzene ring), 7.11 ppm (1H, s, dioxazine ring), 7.08–7.10 ppm (1H, d, naphthalene ring), 7.06 ppm (1, s, dioxazine ring), 3.98 ppm (3H, s, methoxy group), 3.95–3.96 ppm (2H, m, —OCH$_2$—), 2.68–2.71 ppm (2H, t, —CH$_2$—), 1.61–1.67 ppm (2H, m, —CH$_2$—), 1.36–1.40 ppm (2H, m, —CH$_2$—), 1.16–1.31 ppm (18H, br, —CH$_2$—), 0.85–0.96 ppm (6H, m, —CH$_3$).

Incidentally, the chemical shift was calculated using tetramethylsilane as a reference (0ppm).

From the results mentioned above, the obtained unsymmetrical dioxazine compound was determined to have the structure represented by the formula (8):

(8)

Evaluation of Dichroic Ratio

In the same fashion as in Example 1, a liquid crystal composition was prepared by mixing 0.1% by weight of the obtained unsymmetrical dioxazine compound represented by the formula (8) with a liquid crystal composition E7 (manufactured by MERCK JAPAN LIMITED). The resulting liquid crystal composition and the liquid crystal composition E7 per se were respectively sealed in a cell, and the absorption, the dichroic ratio, and the half-width of the absorption were determined. The results are shown in Table 1.

Example 3

An unsymmetrical dioxazine compound represented by the formula (10) was obtained through a similar process as in Example 1, except that a 2,5-diamino-1,4-benzoquinone compound represented by the formula (9) was used in place of the 2,5-diamino-1,4-benzoquinone compound represented by the formula (5).

(9)

(10)

The structure of the dioxazine compound thus obtained was determined from the mass spectrum (FDMS).

Evaluation of Dichroic Ratio

A liquid crystal composition was prepared by mixing 0.1% by weight of the obtained unsymmetrical dioxazine compound represented by the formula (10) with a liquid crystal composition E7 (manufactured by MERCK JAPAN LIMITED). The resulting liquid crystal composition and the liquid crystal composition E7 per se were respectively sealed in a cell, and the absorption, the dichroic ratio, and the half-width of the absorption were determined in the same fashion as in Example 1. The results are shown in Table 1.

Example 4

An unsymmetrical dioxazine compound represented by the formula (12) was obtained through a similar process as in Example 1, except that a 2,5-diamino-1,4-benzoquinone compound represented by the formula (11) was used in place of the 2,5-diamino-1,4-benzoquinone compound represented by the formula (5).

(11)

(12)

The structure of the dioxazine compound thus obtained was determined from the mass spectrum (FDMS).

Evaluation of Dichroic Ratio

A liquid crystal composition was prepared by mixing 0.1% by weight of the obtained unsymmetrical dioxazine compound represented by the formula (12) with a liquid crystal composition E7 (manufactured by MERCK JAPAN LIMITED). The resulting liquid crystal composition and the liquid crystal composition E7 per se were respectively sealed in a cell, and the absorption, the dichroic ratio, and the half-width of the absorption were determined in the same fashion as in Example 1. The results are shown in Table 1.

Example 5

An unsymmetrical dioxazine compound represented by the formula (13) was obtained through a similar process as in Example 1, except that the 2,5-diamino-1,4-benzoquinone compound represented by the formula (9) was used in place of the 2,5-diamino-1,4-benzoquinone compound represented by the formula (5), and paramethylbenzoylchloride was used in place of the 4-(n)-butylbenzoylchloride.

(13)

The structure of the dioxazine compound thus obtained was determined from the mass spectrum (FDMS).

Evaluation of Dichroic Ratio

A liquid crystal composition was prepared by mixing 0.1% by weight of the obtained unsymmetrical dioxazine compound represented by the formula (13) with a liquid crystal composition E7 (manufactured by MERCK JAPAN LIMITED). The resulting liquid crystal composition and the liquid crystal composition E7 per se were respectively sealed in a cell, and the absorption, the dichroic ratio, and the half-width of the absorption were determined in the same fashion as in Example 1. The results are shown in Table 1.

Example 6

An unsymmetrical dioxazine compound represented by the formula (14) was obtained through a similar process as in Example 1, except that the 2,5-diamino-1,4-benzoquinone compound represented by the formula (9) was used in place of the 2,5-diamino-1,4-benzoquinone compound represented by the formula (5), and 4-(t)-butylbenzoylchloride was used in place of the 4-(n)-butylbenzoylchloride.

(14)

The structure of the dioxazine compound thus obtained was determined from the mass spectrum (FDMS).

Evaluation of Dichroic Ratio

A liquid crystal composition was prepared by mixing 0.1% by weight of the obtained unsymmetrical dioxazine compound represented by the formula (14) with a liquid crystal composition E7 (manufactured by MERCK JAPAN LIMITED). The resulting liquid crystal composition and the liquid crystal composition E7 per se were respectively sealed in a cell, and the absorption, the dichroic ratio, and the half-width of the absorption were determined in the same fashion as in Example 1. The results are shown in Table 1.

Comparative Example 1

Synthesis of Dianilide Compound

To 50 g of ethanol, 1.6 g of an aniline compound represented by the formula (15), 0.6 g of chloranyl, and 0.6 g of sodium acetate were added, and the resulting mixture was refluxed for 7 hours. The reacted mixture was poured into 100 ml of water, and filtered. The reactant left on the filter was washed with water, warm water, a 5% hydrochloric acid aqueous solution, and water again, and then dried, thereby obtaining 1.4 g of dianilide compound represented by the formula (16):

(15)

(16)

Synthesis of Dioxazine Compound

To 40 g of nitrobenzene, 1.4 g of the obtained dianilide compound and 0.3 g of benzoyl chloride were added. The resulting mixture was kept at 150–160° C. for 4 hours, and then allowed to cool. The resulting precipitate was separated by filtration, and purified repeatedly by silica gel column chromatography, thereby obtaining a dioxazine compound. The structure of the dye thus obtained was determined from the FDMS as a compound represented by the formula (17):

(17)

Evaluation of Dichroic Ratio

A liquid crystal composition was prepared by mixing 0.1% by weight of the obtained dioxazine dye with the liquid crystal composition E7 (manufactured by MERCK JAPAN LIMITED). The obtained liquid crystal composition was sealed in a cell, and subjected to the same measurements as in Example 1. The results are shown in Table 1.

Comparative Example 2

A liquid crystal composition was prepared by mixing 0.1% by weight of a dioxazine compound represented by the formula (18) with the liquid crystal composition E7 (manufactured by MERCK JAPAN LIMITED). The obtained liquid crystal composition was sealed in a cell, and subjected to the same measurements as in Example 1. The results are shown in Table 1.

(18)

Comparative Example 3

Evaluation of Dichroic Ratio

A liquid crystal composition was prepared by mixing 0.1% by weight of an azo dye represented by the formula (19) (manufactured by NIPPON KANKOH-SHIKISO KENKYUSHO CO., LTD., trade name G205) with the liquid crystal composition E7 (manufactured by MERCK JAPAN LIMITED). The obtained liquid crystal composition was sealed in a cell, and subjected to the same measurements as in Example 1. The results are shown in Table 1.

(19)

TABLE 1

| | Kind of Liquid Crystal Composition | Peak Absorption (nm) | Dichroic Ratio | Half-width of Absorption (nm) |
|---|---|---|---|---|
| Example 1 | E7 | 581 | 7.8 | 73 |
| | E9 | 589 | 8.9 | 70 |
| | ZLI1132 | 583 | 9.8 | 70 |
| Example 2 | E7 | 585 | 5.2 | 70 |
| Example 3 | E7 | 588 | 8.0 | 69 |
| Example 4 | E7 | 580 | 5.9 | 70 |
| Example 5 | E7 | 589 | 8.5 | 70 |
| Example 6 | E7 | 587 | 8.7 | 69 |
| Comp. Ex. 1 | E7 | 552 | 3.3 | 60 |
| Comp. Ex. 2 | E7 | 552 | 3.4 | 61 |
| Comp. Ex. 3 | E7 | 505 | 11.3 | 120 |

Although the present invention has been described with reference to the preferred examples, it should be understood that various modifications and variations can be easily made by those skilled in the art without departing from the spirit of the invention. Accordingly, the foregoing disclosure should be interpreted as illustrative only and is not to be interpreted in a limiting sense. The present invention is limited only by the scope of the following claims.

What is claimed is:

1. An unsymmetrical dioxazine compound represented by the formula (1-1) or (1-2):

(1-1)

(1-2)

wherein each of $Y^1$ to $Y^3$ stands for a group represented by the formula (2) or (3) with at least one of $Y^1$ to $Y^3$ being a group represented by the formula (2); X stands for a hydrogen atom, a halogen atom, a cyano group, an alkyl group, an aryl group, an alkoxy group, an acylamino group, or a carboxylate group:

(2)

(3)

wherein h is an integer of 0 to 2, i is an integer of 1 to 2, and j is an integer of 0 to 2; A stands for a group selected from group (I) consisting of:

(I)

wherein k is an integer of 1 to 6; one or more of hydrogen atoms in a phenylene group may be substituted by an alkyl group having 1 to 12 carbon atoms, an alkoxy group having 1 to 12 carbon atoms, a perfluoroalkyl group having 1 to 6 carbon atoms, or a halogen atom; when said A is a group having ends (a) and (b), the end (a) binds to E or G and the end (b) binds to an ester group in the formula (2);

each of E, J, and M stands for a group selected from group (I) consisting of:

wherein m is an integer of 1 to 12, and each of q and r is an integer of 1 to 8; one or more of hydrogen atoms in a phenylene group may be substituted by an alkyl group having 1 to 6 carbon atoms, an alkoxy group having 1 to 6 carbon atoms, a perfluoroalkyl group having 1 to 6 carbon atoms, or a halogen atom; when E in the formula (2) is a group having ends (a) and (b), the end (a) binds to G or E and the end (b) binds to A or E; when J in the formula (3) is a group having ends (a) and (b), the end (a) binds to M, J, or Q, and the end (b) binds to J or the triphenodioxazine skeleton; when M in the formula (3) is a group having ends (a) and (b), the end (a) binds to M or Q and the end (b) binds to M or J;

G and Q each stands for a group selected from group (III) consisting of:

wherein n is an integer of 1 to 12, and each of q, r, and s is an integer of 1 to 8.

2. A dichroic dye consisting of an unsymmetrical dioxazine compound as defined in claim 1.

3. A liquid crystal composition comprising at least one dichroic dye as defined in claim 2 and a liquid-crystalline material.

4. A liquid crystal display element comprising at least one liquid crystal composition as defined in claim 3.

5. An unsymmetrical dioxazine compound represented by one of the following formulae:

-continued

-continued

(8)

-continued (10)

(12)

(13)

(14)

* * * * *